3,714,125
AROMATIC ORTHO-CARBAMATES ADDED TO POLYESTER POLYCONDENSATION
Takeo Shima, Takanori Urasaki, and Isao Oka, Iwakuni, Japan, assignors to Teijin Limited, Osaka, Japan
No Drawing. Filed Mar. 15, 1971, Ser. No. 124,507
Claims priority, application Japan, Mar. 19, 1970, 45/23,285
Int. Cl. C08g 17/015
U.S. Cl. 260—75 M             12 Claims

ABSTRACT OF THE DISCLOSURE

During the formation of a fiber-forming polyester by the reaction of a dicarboxylic acid or its functional derivative with a glycol, an aromatic ortho-carbonate such as tetraphenyl carbonate is added at a certain stage of the polycondensation where the intrinsic viscosity $[\eta]$ of the polyester is at least 0.2, whereby a fiber-forming polyester of a low content of free carboxyl groups is prepared. Moreover, the reaction rate of the polycondensation is greatly increased by selecting and using a suitable aromatic ortho-carbonate and therefore a fiber-forming polyester of a very high molecular weight can be obtained.

---

This invention relates to an improvement of a process for the preparation of polyesters by melt polymerization. More detailedly, this invention relates to a process for the preparation of substantially linear, fiber-forming or film-forming polyesters from a dicarboxylic acid or its functional derivative (which will be referred to simply as "dicarboxylic acid component" hereinbelow) or a hydroxycarboxylic acid or its functional derivative (which will be referred to simply as "hydroxycarboxylic acid component" hereinbelow) and a glycol, such process being characterized by the addition of an aromatic ortho-carbonate at a certain stage of the polycondensation reaction to thereby form polyesters having a low free carboxyl group content.

It has been well-known in the art that polyesters are prepared from a dicarboxylic acid and a dihydric alcohol. More specifically, it has been known that polyesters are formed by the reaction between a glycol (dihydric alcohol) and at least one member selected from aliphatic dicarboxylic acids of 4–20 carbon atoms such as succinic acid, adipic acid and sebacic acid and aromatic dicarboxylic acids such as terephthalic acid, isophthalic acid, diphenyl-4,4'-dicarboxylic acid, naphthalene-2,6-dicarboxylic acid, diphenylether - 4,4' - dicarboxylic acid, diphenylsulfone - 4,4' - dicarboxylic acid, diphenylmethane-4,4'-dicarboxylic acid and diphenoxyethane - 4,4'-dicarboxylic acid; and that these polyesters are useful as starting materials of fibers or films.

As the glycol one or more members selected from 1,2-glycols which are aliphatic or alicyclic dihydric alcohols containing hydroxyl groups bonded to adjacent carbon atoms, such as ethylene glycol, propylene glycol, butane-1,2-diol, cyclohexane-1,2-diol and cyclopentane-1,2-diol; 1,3-glycols which are aliphatic or alicyclic dihydric alcohols having alcoholic hydroxyl groups bonded to the carbon atoms at the 1- and 3-positions, such as trimethylene glycol, neopentylene glycol, butane-1,3-diol and cyclohexane-1,3-diol; and other glycols such as tetramethylene glycol, hexamethylene glycol, decamethylene glycol, cyclohexane-1,4-diol, cyclohexane-1,4-dimethanol and para-xylylene glycol are used. Among these glycols, 1,2-glycols may be used also in the form of a reactive derivative such as a carbonic acid ester or anhydride.

Polyesters composed of the above-mentioned dicarboxylic acid and glycol are prepared by a two-staged method comprising the first step of forming a precondensate by the direct esterification reaction between the dicarboxylic acid and glycol, the ester exchange reaction between a functional derivative, such as a lower alkyl or phenyl ester, of the dicarboxylic acid and the glycol, or the addition reaction between the dicarboxylic acid and an alkylene oxide; and the second step of forming a high polymer by heating the precondensate at a reduced pressure and/or in an inert gas current to thereby remove the glycol.

In this specification, the above-mentioned dicarboxylic acids and their functional derivatives such as alkyl esters and phenyl esters are inclusively indicated by the term "dicarboxylic acid component."

There has also been known a method of preparing polyesters comprising reacting a hydroxycarboxylic acid such as $\omega$-hydroxycaproic acid, p-hydroxybenzoic acid, p-($\beta$-hydroxyethoxy)benzoic acid, p - 4 - ($\beta$-hydroxyethoxy)-phenylbenzoic acid and $\beta$-hydroxyethoxyvanillic acid or a functional derivative thereof such as lower aliphatic esters and phenyl esters, with a glycol such as recited above or a reactive derivative thereof, to form a glycol ester or a low polymer, and polycondensing the same to form a substantially linear, film-forming or fiber-forming polyester.

The above-mentioned hydroxycarboxylic acids and their functional derivatives are inclusively indicated by the term "hydroxycarboxylic acid component" in this specification.

The polycondensation of the ester or low polyester formed by the reaction between the dicarboxylic acid component or hydroxycarboxylic acid component and the glycol component is conducted with removal of the glycol. This polycondensation reaction is allowed to advance even in the absence of a catalyst, but the reaction rate is extremely low in this case. Accordingly, the rate of the polycondensation reaction is generally increased by employing such catalysts as antimony trioxide, antimony acetate, antimony trifluoride, antimony glycolate, tetrabutyl titanate, tetrapropyl titanate, potassium ethyl titanate ($K_2Ti(OC_2H^5)_6$), germanium dioxide, tetrabutyl germanate ($Ge(OC_4H_9)_4$), zinc acetate, lead oxide and manganese acetate. However, it takes a considerably long time to complete this polycondensation reaction even with use of such catalysts, and it is necessary to conduct the reaction at such high temperatures as 200–350° C. Therefore, occurrence of side reactions such as thermal decomposition cannot be avoided, resulting in an increase of the amount of terminal carboxyl groups and in formation of polyesters having poor heat stability. For instance, when polyethylene terephthalate is prepared on a commercial scale, it is necessary to carry out the reaction at such high temperatures as ranging from 270° C. to 290° C. under such a high vacuum as 0.1 mm. Hg for 2–10 hours. In order to maintain the output at a certain level it is necessary to provide large equipment. Further, since the reactants are exposed to high temperatures for a long time, side reactions such as thermal decomposition are caused to advance together with the polycondensation reaction, and it is considerably difficult to reduce the content of terminal carboxyl groups below a certain limit and to obtain a polymer having a degree of polymerization exceeding a certain level.

The primary object of this invention is to provide a process for the preparation of polyesters in which the content of free carboxyl groups (terminal carboxyl groups) is very low.

Another object of this invention is to provide a process for the preparation of fiber-forming or film-forming polyesters wherein the rate of the polycondensation reaction is increased and intended products are obtainable by a short-time polycondensation reaction.

Still another object of this invention is to provide a process according to which polyesters having such a high degree of polymerization, namely such a high molecular weight, as has hardly been obtained by the conventional techniques can be obtained.

Other objects and advantages of this invention will be apparent from the description given hereinbelow.

These objects and advantages of this invention can be attained by a process for preparing substantially linear, highly polymerized polyester comprising removing, from a glycol ester of a dicarboxylic acid or hydroxycarboxylic acid or its low condensate, the glycol to thereby effect the polycondensation, wherein at least one aromatic orthocarbonate expressed by the general formula

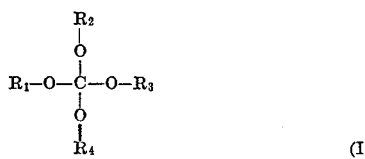  (I)

wherein $R_1$, $R_2$, $R_3$ and $R_4$, which may be the same or different, stand for a monovalent aromatic group containing a benzene or naphthalene nucleus, which is inert to the ester-forming reaction and has a molecular weight not exceeding 250, is added to a molten polyester having an intrinsic viscosity of at least 0.2 and the polycondensation reaction is conducted under conditions such that the reaction mixture will be maintained in the molten state at a subatmospheric pressure.

The value of intrinsic viscosity used in the specification and claims is one calculated from the value measured in orthochlorophenol at 35° C.

This invention will now be detailed.

As the dicarboxylic acid component or hydroxycarboxylic acid component, any member selected from the above-mentioned compounds, and any of the glycols or reactive derivatives thereof recited hereinabove may be used as the glycol component.

In this invention any of the known catalysts used at the polycondensation step of the ester-forming reaction, inclusive of those mentioned hereinabove, in conducting the polycondensation of lowly polymerized polyesters may be used.

Any conventional process known as a polyester preparation process may be adopted for forming a polyester to be used in this invention, from the dicarboxylic acid or hydrocarboxylic acid component and the glycol or its reactive derivative. Not only can the above-mentioned known catalysts be used at the polycondensation reaction stage but at the stage of forming from the dicarboxylic acid or hydroxycarboxylic acid component and the glycol or its reactive derivative, a glycol ester of the acid or a low condensate thereof, known catalysts such as conventional ester exchange reaction catalysts can be used. Further, in order to prevent decomposition of the reaction product during the polycondensation reaction, it is possible to add to the reaction mixture a stabilizer such as phosphorous acid, phosphoric acid and derivatives thereof, and/or a delustering agent such as titanium oxide, Still further, in order to be copolymerize a monofunctional compound such as benzoic acid, benzoyl benzoic acid and alkoxypolyalkylene glycols with the ends of the resulting polyester or to copolymerize a trifunctional or more highly functional compound such as glycerin, pentaerythritol, benzene tetracarboxylic acid, hydroxyisophthalic acid and pyromellitic acid, with the ends of the resulting polyester, it is possible to add such monofunctional or polyfunctional compounds in small quantities to the reaction system at the polycondensation stage.

In this invention, at the stage of polycondensing a lowly polymeric polyester, an aromatic ortho-carbonate expressed by the above-mentionel general Formula I is added to the melt of the polycondensation reaction product (polyester) when the intrinsic viscosity of the polycondensation reaction product reaches at least 0.2, preferably at least 0.3, and the polycondensation reaction is further continued until a polyester of a desired intrinsic viscosity is obtained.

Any compound expressed by above general Formula I may be added as the aromatic ortho-carbonate. In the explanation of general Formula I, each of $R_1$, $R_2$, $R_3$ and $R_4$ is defined as an aromatic group "inert to the ester-forming reaction." This means that aromatic groups constituting the aromatic ortho-carbonate have no functional substituent capable of forming an ester under the conditions of the polyester-forming reaction intended in this invention. More specifically, any of aromatic groups $R_1$, $R_2$, $R_3$ and $R_4$, namely phenyl and/or naphthyl groups constituting the aromatic ortho-carbonate of general Formula I, should not have an ester-forming functional substituent such as a carboxyl (—COOH) group, an alkoxycarbonyl (—COOR in which R is a monovalent hydrocarbon residue) group, a hydroxyl (—OH) group or an acyloxy (—OCOR in which R is as defined above) group.

The reason why in the above general Formula I it is specified that each of $R_1$, $R_2$, $R_3$ and $R_4$ has a molecular weight not exceeding 250 is that when one or more of these aromatic groups has a molecular weight exceeding 250, though the intended effect of reducing the free carboxyl group content in the resulting polyester is attained more or less, the amount of the aromatic ortho-carbonate added should be increased because of the high molecular weight, which results in economical disadvantages, and that because products formed by the decomposition of the aromatic ortho-carbonate of such high molecular weight are difficult to remove from the polycondensation system by distillation, there is sometimes caused the reduction of the molecular weight in the resulting polyester.

Accordingly, in this invention it is particularly preferred that each of $R_1$, $R_2$, $R_3$ tnd $R_4$ has a molecular weight not exceeding 200.

Aromatic ortho-carbonates to be used preferably in this invention are expressed by the following general Formula I':

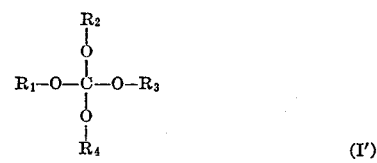  (I')

wherein $R_1$, $R_2$, $R_3$ and $R_4$, which may be the same or different, stand for a member selected from phenyl and naphthyl groups which may have one or more substituents selected from the group consisting of aliphatic hydrocarbon residues, alicyclic hydrocarbon residues, aromatic hydrocarbon residue, halogen atoms, nitro group, alkoxy groups and aryloxy groups, with the proviso that each of aromatic groups $R_1$, $R_2$, $R_3$ and $R_4$ has a molecular weight not exceeding 200, Preferable examples of the aromatic ortho-carbonate to be used in this invention areas follows:

tetraphenyl ortho-carbonate of the following formula

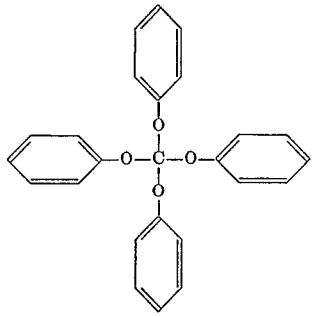

tetra-p-tolyl ortho-carbonate,
tetra-m-tolyl ortho-carbonate,
tetra-o-tolyl ortho-carbonate,
tetra-p-ethyphenyl ortho-carbonate,
tetra-p-isopropylphenyl ortho-carbonate,
tetra-p-tert-butylphenyl ortho-carbonate,
tetra-p-octylphenyl ortho-carbonate,
tetra-3,4-dimethylphenyl ortho-carbonate,
tetra-3-methyl-4-ethylphenyl ortho-carbonate,
tetra-2-ethyl-5-isopropylphenyl ortho-carbonate,
tetra-2-ethyl-4,6-dimethylphenyl ortho-carbonate,
tetra-2,4,5-tributylphenyl ortho-carbonate,
tetra-α-(5,6,7,8-tetrahydronaphthyl)ortho-carbonate,
tetra-p-cyclohexylphenyl ortho-carbonate,
tetra-p-cyclopentylphenyl ortho-carbonate,
tetra-p-(3-methylcyclohexyl)phenyl ortho-carbonate,
tetra-p-(2-ethylcyclopentyl)phenyl ortho-carbonate,
tetra-p-benzylphenyl ortho-carbonate,
tetra-(2-methyl-4-benzyl)phenyl ortho-carbonate,
tetra-p-(3-methylbenzyl)phenyl ortho-carbonate,
tetra-p-chlorophenyl ortho-carbonate,
tetra-o-chlorophenyl ortho-carbonate,
tetra-p-bromophenyl ortho-carbonate,
tetra-p-benzylphonyl ortho-carbonate,
tetra-2-methyl-4-chlorophenyl ortho-carbonate,
tetra-p-nitrophenyl ortho-carbonate,
tetra-3-ethyl-4-nitrophenyl ortho-carbonate,
tetra-m-methoxyphenyl ortho-carbonate,
tetra-p-ethoxyphenyl ortho-carbonate,
tetra-p-butoxyphenyl ortho-carbonate,
tetra-p-phenoxyphenyl ortho-carbonate,
tetra-p-(4-methylphenoxy)phenyl ortho-carbonate,
tetra-α-naphthyl ortho-carbonate of the following formula

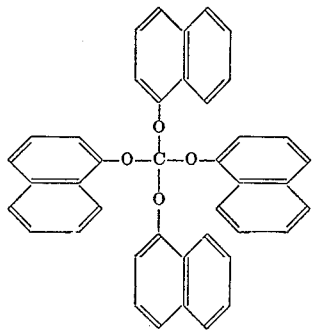

tetra-β-naphthyl ortho-carbonate,
tetra-α-(4-methylnaphthyl) ortho-carbonate,
tetra-α-(4-propylnaphthyl) ortho-carbonate,
tetra-β-(4-methylnaphthyl) ortho-carbonate,
tetra-β-(6-ethylnaphthyl) ortho-carbonate,
tetra-β-(7-cyclohexylnaphthyl) ortho-carbonate,
tetra-α-(4-benzylnaphthyl) ortho-carbonate,
tetra-α-(4-chloronaphthyl) ortho-carbonate,
tetra-β-(5-nitronaphthyl) ortho-carbonate,
tetra-α-(4-methoxynaphthyl) ortho-carbonate,
tetra-α-(4-phenoxynaphthyl) ortho-carbonate, tetra-p-phenylphenyl ortho-carbonate of the following formula

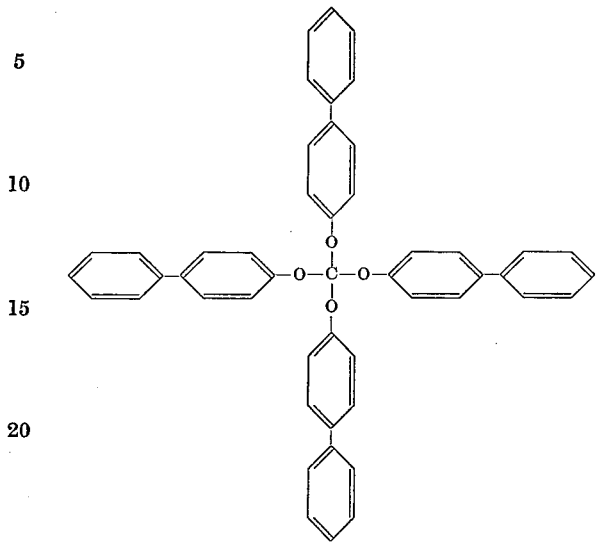

tetra-m-phenylphenyl ortho-carbonate,
tetra-3-phenyl-4-methylphenyl ortho-carbonate,
tetra-p-(methylphenyl)phenyl ortho-carbonate,
tetra-p-(4-cyclohexylphenyl)phenyl ortho-carbonate,
tetra-p-(3-chlorophenyl)phenyl ortho-carbonate,
tetra-p-(4-nitrophenyl)phenyl ortho-carbonate,
tetra-p-(4-methoxyphenyl)phenyl ortho-carbonate,
diphenyl-di-α-naphthyl ortho-carbonate,
diphenyl-di-(p-phenyl)phenyl ortho-carbonate,
diphenyl-di-p-tolyl ortho-carbonate,
di-p-tolyl-di-p-tert-butylphenyl ortho-carbonate,
diphenyl-di-p-chlorophenyl ortho-carbonate,
di-p-tolyl-di-p-nitrophenyl ortho-carbonate,
triphenyl-p-butylphenyl ortho-carbonate, and
phenyl-o-tolyl-m-tolyl-p-octylphenyl ortho-carbonate.

In this invention the aromatic ortho-carbonate is added to a molten polyester at the stage where the intrinsic viscosity of the polyester reaches at least 0.2, preferably at least 0.3. In case the addition of the aromatic ortho-carbonate is effected before the intrinsic viscosity of the molten polyester reaches 0.2, the reduction of the free carboxyl group content in the final polyester is not very prominent irrespectively of the amount of the aromatic ortho-carbonate added, as compared with the case where the addition of the aromatic ortho-carbonate is not effected. In such case, if the amount of the aromatic ortho-carbonate added is large, the rate of the polycondensation reaction is lowered and it is impossible to obtain a polyester of a high degree of polymerization. For these reasons, in this invention the aromatic ortho-carbonate is added to a molten polyester at the stage where its intrinsic viscosity reaches at least 0.2. Particularly excellent results are obtained when the aromatic ortho-carbonate is added to a molten polyester having an intrinsic viscosity of at least 0.3.

If the addition of the aromatic ortho-carbonate is effected at any stage of the polycondensation reaction after the intrinsic viscosity of the molten polyester has reached at least 0.2, preferably at least 0.3, the intended effect of reducing the free carboxyl group content in the final polyester can be attained efficiently. In other words, there is no upper limit on the intrinsic viscosity of a polyester to which the aromatic ortho-carbonate is added.

Accordingly, in this invention it is possible to effectively reduce the free carboxyl group content of commercially available polyesters prepared by conventional techniques by remelting such commercially available polyesters, adding the aromatic ortho-carbonate to the polyester melt, and further conducting the polycondensation reaction to a desired extent while maintaining the polyester in the molten state at a subatmospheric pressure. In this case, the degree of polymerization of the polyester can be further increased, as is described below, by adjusting the amount of the aromatic ortho-carbonate suitably added.

As is mentioned above, in this invention the addition of the aromatic ortho-carbonate may be effected at any stage after the intrinsic viscosity of the polyester has reached at least 0.2, preferably at least 0.3. If this requirement is satisfied, the addition of the aromatic ortho-carbonate is effected at one time or the aromatic ortho-carbonate may be added incrementally at a desired frequency. However, it is preferable that the addition is effected at the time when the intrinsic viscosity of the polyester to which the aromatic ortho-carbonate is added is about 0.1–0.5 lower than the intrinsic viscosity of the intended final polyester.

The amount of the aromatic ortho-carbonate added is not particularly critical. Even if the aromatic ortho-carbonate is added in a small amount, an effect keeping with the amount added can be obtained, and the greater the amount added, the higher is the effect of reducing the free carboxyl group content.

In this invention, however, it is preferably that the amount of the aromatic ortho-carbonate to be added at one time is N mole percent expressed by the following Formula II, especially N' mole percent expressed by the following Formula II':

$$N \leq 3 \times [\eta]^{-1.3} \quad \text{(II)}$$

$$N' \leq 1 \times [\eta]^{-1.3} \quad \text{(II')}$$

where $[\eta]$ designates the intrinsic viscosity of the polyester at the time when the aromatic ortho-carbonate is added, and N or N' stands for the mole percent of the aromatic ortho-carbonate to be added based on the total acid components constituting the polyester.

By the term "amount added at one time" is not always meant an amount added in an instant but an amount added over a reasonable period of time.

Further, it is preferable that the amount of the aromatic ortho-carbonate added is N mole percent expressed by the following Formula III, especially N' mole percent expressed by the following Formula III':

$$0.05 \times [\eta]^{1.3} \leq N \quad \text{(III)}$$

$$0.1 \times [\eta]^{1.3} \leq N' \quad \text{(III')}$$

where $[\eta]$, N and N' are as defined in above Formulae II and II'.

The objects of this invention can be attained conveniently if the amount of the aromatic ortho-carbonate added (the total amount if the addition is effected incrementally) is adjusted to N mole percent expressed by Formula III, especially N' mole percent expressed by Formula III'.

When the amount of the aromatic ortho-carbonate added is suitably adjusted in the light of conditions of Formula II, especially Formula II', and of Formula III, especially Formula III', there can be attained not only the effect of reducing the free carboxyl group content in the final polyester to a preferable level, but also the effect of increasing the rate of the polycondensation reaction prominently after the addition of the aromatic ortho-carbonate. Furthermore, if the addition is effected at a suitable stage as mentioned above, it is possible to reduce the free carboxyl group content to such a degree not attainable or possible in the conventional technique, for instance, to less than 15 equivalents per $10^6$ g. of polyester, and to obtain easily an extremely highly polymerized linear polyester having an intrinsic viscosity of 0.85 or more.

Preferable amounts of the aromatic ortho-carbonate to be added and preferable manners of the addition may be easily determined by those skilled in the art based on experimental results of comparison of the intrinsic viscosity of the polyester at the time when the addition is effected, with the intrinsic viscosity of the polyester obtained by conducting the polycondensation for a certain period of time after the addition of the aromatic ortho-carbonate, in the light of conditions of Formula II or II' and Formula III or III'.

In this invention, after the aromatic ortho-carbonate is added, the heating is further continued at a subatmospheric pressure while maintaining the reaction mixture in the molten state, until the free carboxyl group content of the resulting polyester reaches a desired level. This polycondensation is accomplished by heating the reaction mixture under conditions such that the reaction mixture will be maintained in the molten state at a subatmospheric pressure of less than 100 mm. Hg, preferably less than 50 mm. Hg.

The polyester obtained according to this invention is characterized by a very low content of the terminal carboxyl groups and is excellent in color hue. Further, its softening point is hardly different from that of a polyester obtained by the conventional technique. Still further, in this invention it is possible to shorten the time required for the polycondensation reaction very much as compared with the conventional process, by adjusting the amount of the aromatic ortho-carbonate suitably added. Thus, this invention makes various meritorious advantages to the art.

A process has been proposed for preparing polyesters of low free carboxyl group contents at high polycondensation rates which comprises adding a diaromatic carbonic ester such as diphenyl carbonate to the polyester polycondensation system at the stage where the intrinsic viscosity of the polyester reaches at least 0.2 (see, for instance, specifications of U.S. Pat. No. 3,444,141 and British Pat. No. 1,074,204). As compared with this previous proposal using the diaromatic carbonic ester, this invention employing the aromatic ortho-carbonate can more effectively reduce the free carboxyl group content in the polyester, if the polycondensation reaction is conducted for the same period of time. According to this invention, it is possible to prepare by simple operations substantially linear polyesters having a low free carboxyl group content such as 4 equivalents per $10^6$ g. of polyester by selecting suitable conditions. Moreover, according to this invention, as explained above, it is possible to greatly increase the rate of the polycondensation reaction by adjusting the amount of the aromatic ortho-carbonate added within suitable ranges.

Since highly polymerized polyesters prepared according to this invention exhibit a very low content of the free carboxyl groups, they are excellent in thermal stability, especially thermal stability under wet or moist conditions, and their other physical and chemical properties are comparable to those of polyesters prepared by the conventional process. For instance, the softening point of highly polymeric polyesters such as polyethylene terephthalate is hardly different from that of conventional products, and the dyeability of fibers of polyethylene terephthalate prepared according to this invention with disperse dyes is comparable to that of fibers of polyethylene terephthalate prepared according to the conventional process, while the thermal stability, especially the thermal stability under wet or moist conditions, of the polyethylene terephthalate according to this invention is far superior to that of the conventional polyethylene terephthalate.

The process of this invention will now be detailed by referring to examples. In examples, the value of the intrinsic viscosity is one calculated from the value measured at 35° C. with respect to a solution of polyester in ortho-chlorophenol, and the content of the terminal carboxyl group is measured in accordance with the method of A. Conix (Makromol Chem., 26, 226 (1958)).

EXAMPLE 1 AND COMPARATIVE EXAMPLES 1-2

An ester-exchange reaction vessel was charged with 30 kg. of dimethyl terephthalate, 19.8 kg. of ethylene glycol, 22.8 g. of magnesium acetate, 4.8 g. of cobalt acetate and 12.2 g. of antimony trioxide, and the ester exchange reaction was carried out at 120-230° C. After completion of the ester exchange reaction, trimethyl phosphate was added to the reaction mixture in an amount equimolar to the sum of the magnesium acetate and cobalt acetate, and the reaction mixture was transferred into a polymerization vessel. The inside temperature was raised to 260° C. over a period of about 15 minutes, and in the subsequent 80 minutes, the inside temperature was elevated to 285° C. and the inside pressure was reduced to a high vacuum of 0.1-0.2 mm. Hg, following which the polycondensation was further conducted for 40 minutes under 0.1-0.2 mm. Hg. The intrinsic viscosity of the resulting polyester was about 0.4. At this stage, 300 g. of tetraphenyl ortho-carbonate were added to the reaction system while maintaining it at above high vacuum. Then, the polycondensation was further conducted for about 10 minutes at a high vacuum of 0.1-0.2 mm. Hg. The intrinsic viscosity [$\eta$] of the resulting polyester and the terminal carboxyl group content (—COOH equivalents per $10^6$ g. of polymer) are shown in Table 1.

For comparison, data of polyesters obtained by conducting the polycondensation at a high vacuum of 0.1-0.3 mm. Hg for 50 or 100 minutes in the same manner as above except that the aromatic dicarbonate was not added, are also shown in Table 1.

In Table 1, the amount (mole percent) of the aromatic ortho-carbonate is expressed in terms of the mole percent based on the acid component of the polyester, which is the same in all subsequent examples.

TABLE 1

| | Aromatic ortho-carbonate | | | [$\eta$] of polyester at time of addition of aromatic ortho-carbonate | Total time of high vacuum reaction (min.) | Resulting polyester | | Softening point (° C.) |
|---|---|---|---|---|---|---|---|---|
| | Kind | Amount added | | | | [$\eta$] | COOH equivalents per $10^6$ g. of polymer | |
| | | G. | Mole percent | | | | | |
| Example 1 | Tetraphenyl ortho-carbonate | 300 | 0.505 | 0.422 | 50 | 0.656 | 2.5 | 262.0 |
| Comparative Example: | | | | | | | | |
| 1 | Not added | | | | 50 | 0.458 | 13.1 | 262.5 |
| 2 | do | | | | 100 | 0.655 | 24.5 | 262.0 |

EXAMPLE 2 AND COMPARATIVE EXAMPLES 3-6

An ester-exchange reaction vessel was charged with 10 kg. of dimethyl terephthalate, 6.61 kg. of ethylene glycol, 6.24 g. of calcium acetate, 0.40 g. of cobalt acetate and 4.04 g. of antimony trioxide, and the ester-exchange reaction was accomplished by heating the mixture at 170-230° C. After completion of the ester-exchange reaction, trimethyl phosphate was added to the reaction mixture in an amount equimolar to the sum of the calcium acetate and cobalt acetate, and the mixture was transferred to a polymerization vessel. The inside temperature was raised to 260° C. over a period of about 15 minutes, and in the subsequent 60 minutes, the inside temperature was elevated to 285° C. and the pressure was reduced to a high vacuum of 0.1-0.2 mm. Hg, following which the polycondensation was carried out for 80 minutes at a high vacuum of 0.1-0.2 mm. Hg. The intrinsic viscosity of the resulting polyester was about 0.55. At this stage the pressure of the reaction system was returned to atmospheric pressure by introduction of nitrogen gas, and an aromatic carbonate shown in Table 2 was added to the reaction mixture in an amount indicated in Table 2. The reaction was carried out at atmospheric pressure for 5 minutes. Then, the pressure was reduced again and the polycondensation was conducted for 60 minutes at a high vacuum of 0.1-0.2 mm. Hg. The intrinsic viscosity [$\eta$] and the terminal carboxyl group content (—COOH equivalents per $10^6$ g. of polymer) of the resulting polyester are shown in Table 2. For comparison, data of polyesters obtained by conducting the polycondensation at a high vacuum of 0.1-0.3 mm. Hg for 140 minutes or 360 minutes in the same manner as above except that no carbonate was added, are also shown in Table 2.

TABLE 2

| | Carbonate added | | | [$\eta$] of polyester at time of addition of aromatic ortho-carbonate | Total time of high vacuum reaction (min.) | Resulting polyester | |
|---|---|---|---|---|---|---|---|
| | Kind | Amount added | | | | [$\eta$] | COOH equivalents per $10^6$ g. of polymer |
| | | G. | Mole percent | | | | |
| Example 2 | Tetraphenyl ortho-carbonate | 100 | 0.505 | 0.567 | 140 | 0.970 | 12.8 |
| Comparative Example: | | | | | | | |
| 3 | Diphenyl carbonate | 100 | 0.907 | 0.569 | 140 | 0.975 | 22.5 |
| 4 | do | 55.7 | 0.505 | 0.563 | 140 | 0.920 | 24.3 |
| 5 | Not added | | | | 140 | 0.671 | 27.8 |
| 6 | do | | | | 360 | 0.945 | 32.8 |

EXAMPLES 3-23 AND COMPARATIVE EXAMPLE 7

An ester-exchange reaction vessel was charged with 97 g. of dimethyl terephthalate, 69 g. of ethylene glycol, 0.04 g. of antimony trioxide and 0.07 g. of calcium acetate monohydrate. The mixture was heated at 160-225° C. and methanol formed as a result of the ester-exchange reaction was distilled off.

After completion of the ester-exchange reaction, phosphorous acid was added to the reaction mixture in an amount equimolar to the calcium acetate, and the reaction mixture was transferred to a polymerization vessel. The inside temperature was raised to 265° C. over a period of about 30 minutes, and in the subsequent 30 minutes, the inside temperature was elevated to 275° C. and the pressure was reduced to a high vacuum of 0.1- 0.3 mm. Hg. Under these temperature and pressure conditions the high vacuum reaction was conducted for about 50 minutes to form a polyester having an intrinsic viscosity of about 0.5. At this stage, the pressure of the reaction system was returned to atmospheric pressure by introduction of nitrogen and an aromatic ortho-carbonate indicated in Table 3 was added to the reaction mixture in an amount of 1.0 mol percent based on the terephthalic acid component. The reaction was carried out for 3 minutes at atmospheric pressure and then the pressure was reduced to 0.1-0.3 mm. Hg. again, under which the polycondensation was conducted for 30-60 minutes. The intrinsic viscosity [$\eta$] and terminal carboxyl group content (—COOH equivalents per $10^6$ g. of polymer) of the resulting polyester are shown in Table 3.

For comparison, the high vacuum reaction was conducted for 80 minutes at 0.1-0.3 mm. Hg without addition of any aromatic ortho-carbonate. The intrinsic viscosity of the resulting polyester was only 0.658, and the terminal carboxyl group content was 12.0 equivalents per $10^6$ g. of polymer. Thus, the high vacuum polycondensation was further carried out for additional 80 minutes. The intrinsic viscosity and terminal carboxy group content of the resulting polyester are shown in Table 3 (see Comparative Example 7).

intrinsic viscosity of the resulting polyester was only 0.60 and the terminal carboxyl group content was 13.5 equivalents per $10^6$ g. of polymer. Thus, the high vacuum

TABLE 3

| | Aromatic ortho-carbonate | | | [η] of polyester at time of addition of aromatic ortho-carbonate | Total time of high vacuum reaction (min.) | Resulting polyester | |
|---|---|---|---|---|---|---|---|
| | | Amount added | | | | | COOH equivalents per $10^6$ g. of polymer |
| | Kind | G. | Mole percent | | | [η] | |
| Example No.: | | | | | | | |
| 3 | Tetraphenyl ortho-carbonate | 1.92 | 1.0 | 0.486 | 80 | 0.956 | 2.5 |
| 4 | Tetra-p-tolyl ortho-carbonate | 2.20 | 1.0 | 0.500 | 80 | 0.945 | 3.1 |
| 5 | Tetra-p-octylphenyl ortho-carbonate | 4.16 | 1.0 | 0.493 | 80 | 0.935 | 2.1 |
| 6 | Tetra-p-cyclohexylphenyl ortho-carbonate | 3.56 | 1.0 | 0.510 | 80 | 0.928 | 2.2 |
| 7 | Tetra-p-benzylphenyl ortho-carbonate | 3.72 | 1.0 | 0.501 | 80 | 0.935 | 2.3 |
| 8 | Tetra-p-chlorophenyl ortho-carbonate | 2.61 | 1.0 | 0.488 | 80 | 0.948 | 2.1 |
| 9 | Tetra-m-bromophenyl ortho-carbonate | 3.50 | 1.0 | 0.513 | 80 | 0.950 | 1.8 |
| 10 | Tetra-p-nitrophenyl ortho-carbonate | 2.82 | 1.0 | 0.502 | 80 | 0.930 | 3.5 |
| 11 | Tetra-m-methoxyphenyl ortho-carbonate | 2.52 | 1.0 | 0.489 | 80 | 0.948 | 2.2 |
| 12 | Tetra-p-phenoxyphenyl ortho-carbonate | 3.76 | 1.0 | 0.491 | 80 | 0.939 | 3.6 |
| 13 | Diphenyl di-p-tolyl ortho-carbonate | 2.06 | 1.0 | 0.485 | 80 | 0.960 | 2.1 |
| 14 | Diphenyl di-m-nitrophenyl ortho-carbonate | 2.37 | 1.0 | 0.490 | 80 | 0.905 | 2.3 |
| 15 | Tetra-α-naphthyl ortho-carbonate | 2.92 | 1.0 | 0.495 | 80 | 0.902 | 1.8 |
| 16 | Tetra-α-(4-nitronaphthyl) ortho-carbonate | 3.82 | 1.0 | 0.492 | 80 | 0.889 | 3.2 |
| 17 | Tetra-β-(4-methylnaphthyl) ortho-carbonate | 3.20 | 1.0 | 0.499 | 80 | 0.892 | 2.5 |
| 18 | Tetra-α-(4-methoxynaphthyl) ortho-carbonate | 3.52 | 1.0 | 0.486 | 80 | 0.888 | 3.5 |
| 19 | Tetra-α-(4-chloronaphthyl) ortho-carbonate | 3.61 | 1.0 | 0.482 | 80 | 0.885 | 3.0 |
| 20 | Tetra-p-phenylphenyl ortho-carbonate | 3.44 | 1.0 | 0.492 | 80 | 0.875 | 3.5 |
| 21 | Tetra-p-(4-phenoxyphenyl) phenyl ortho-carbonate | 5.28 | 1.0 | 0.489 | 80 | 0.850 | 2.1 |
| 22 | Tetra-p-(3-methoxyphenyl) phenyl ortho-carbonate | 4.04 | 1.0 | 0.483 | 80 | 0.852 | 2.5 |
| 23 | Tetra-m-(4-nitrophenyl) phenyl ortho-carbonate | 4.34 | 1.0 | 0.486 | 80 | 0.848 | 3.1 |
| Comparative Example 7 | Not added | | | | 160 | 0.895 | 18.9 |

EXAMPLES 24–27 AND COMPARATIVE EXAMPLE 8

An ester-exchange reaction vessel was charged with 122 g. of dimethyl naphthalene-2,6-dicarboxylate, 69 g. of ethylene glycol, 0.02 g. of antimony trioxide and 0.07 g. of calcium acetate monohydrate and they were heated at 160–225° C. Methanol formed as a result of the ester-exchange reaction was distilled off.

After completion of the ester-exchange reaction, phosphorous acid was added to the reaction mixture in an amount equimolar to the calcium acetate, and the reaction mixture was transferred to a polymerization vessel. The inside temperature was raised to 265° C. over a period of about 30 minutes, and in the subsequent 30 minutes, the inside temperature was elevated to 285° C. and the pressure was reduced to a high vacuum of 0.1–0.3 mm. Hg. Under these pressure and temperature conditions, the high vacuum polycondensation was conducted for 35 minutes to form a polyester of an intrinsic viscosity of about 0.4. At this stage, the pressure of the reaction system was returned to atmospheric pressure by introduction of nitrogen, and an aromatic ortho-carbonate indicated in Table 4 was added to the reaction mixture in an amount of 1.0 mole percent based on the naphthalene-2,6-dicarboxylic acid component. The reaction was effected at atmospheric pressure for 3 minutes, and then the pressure was reduced to 0.1–0.3 mm. Hg, under which the polycondensation reaction was carried out for 20–50 minutes. The intrinsic viscosity [η] and terminal carboxyl group content (—COOH equivalents per $10^6$ g. of polymer) of the resulting polyester are shown in Table 4.

For comparison, the high vacuum polycondensation was conducted at 0.1–0.3 mm. Hg for 55 minutes. The polycondensation reaction was further continued for additional 30 minutes. The intrinsic viscosity and terminal carboxyl group content are also shown in Table 4 (see Comparative Example 8).

TABLE 4

| | Aromatic ortho-carbonate | | | [η] of polyester at time of addition of aromatic ortho-carbonate | Total time of high vacuum reaction (min.) | Resulting polyester | | Softening point (° C.) |
|---|---|---|---|---|---|---|---|---|
| | | Amount added | | | | | COOH equivalents per $10^6$ g. of polymer | |
| | Kind | G. | Mole percent | | | [η] | | |
| Example: | | | | | | | | |
| 24 | Tetraphenyl ortho-carbonate | 1.92 | 1.0 | 0.401 | 55 | 0.801 | 2.5 | 268.8 |
| 25 | Tetra-p-ethylphenyl ortho-carbonate | 2.48 | 1.0 | 0.400 | 55 | 0.812 | 1.8 | 268.5 |
| 26 | Tetra-m-methoxyphenyl ortho-carbonate | 2.52 | 1.0 | 0.398 | 55 | 0.775 | 1.9 | 268.8 |
| 27 | Tetra-α-naphthyl ortho-carbonate | 2.92 | 1.0 | 0.389 | 55 | 0.765 | 2.3 | 269.0 |
| Comparative Example 8 | Not added | | | | 85 | 0.751 | 18.7 | 269.0 |

EXAMPLE 28–33 AND COMPARATIVE EXAMPLE 9

An ester-exchange reaction vessel was charged with 97 g. of diethyl terephthalate, 69 g. of ethylene glycol 0.04 g. of antimony trioxide and 0.07 g. of calcium acetate monohydrate, and they were heated at 160–225° C. Methanol formed as a result of the ester-exchange reaction was distilled off.

After completion of the ester-exchange reaction, phosphorous acid was added to the reaction mixture in an amount equimolar to the calcium acetate and the reaction mixture was transferred into a polymerization vessel. The inside temperature was raised to 265° C. over a period of about 30 minutes, and in subsequent 30 minutes the inside temperature was elevated to 275° C. and the pressure was reduced to a high vacuum of 0.1–0.3 mm. Hg. Under these temperature and pressure conditions, the high vacuum polycondensation was conducted for a prescribed period of time. At this stage the pressure of the reaction system was returned to atmospheric pressure by introduction of nitrogen, and tetraphenyl ortho-carbonate was added to the reaction mixture in an amount of 1.0 g. (0.52 mole percent of the terephthalic acid component). Then, the reaction was carried out for 3 minutes at atmospheric pressure and the pressure was reduced again to 0.1–0.3 mm. Hg, under which the high vacuum polycondensation was conducted for a prescribed period of time. The intrinsic viscosity [η] and terminal carboxyl group content (—COOH equivalents per $10^6$ g. of polymer) are shown in Table 5

TABLE 5

| | [η] of polyester at time of addition of tetraphenyl ortho-carbonate | Time of high vacuum reaction before addition of tetraphenyl ortho-carbonate (min.) | Time of high vacuum reaction after addition of tetraphenyl ortho-carbonate (min.) | Total time high vacuum reaction (min.) | Resulting polyester | |
|---|---|---|---|---|---|---|
| | | | | | [η] | COOH equivalents per $10^6$ g. of polymer |
| Comparative Example 9 | 0.180 | 10 | 110 | 120 | 0.784 | 16.0 |
| Example: | | | | | | |
| 28 | 0.220 | 20 | 75 | 95 | 0.788 | 10.1 |
| 29 | 0.321 | 30 | 60 | 90 | 0.790 | 6.6 |
| 30 | 0.401 | 35 | 45 | 80 | 0.780 | 3.5 |
| 31 | 0.542 | 50 | 20 | 70 | 0.801 | 3.3 |
| 32 | 0.752 | 90 | 30 | 120 | 1.321 | 4.4 |
| 33 | 0.751 | 90 | 5 | 95 | 0.801 | 1.8 |

EXAMPLES 34–40

An ester-exchange reaction vessel was charged with 97 g. of dimethyl terephthalate, 69 g. of ethylene glycol, 0.04 g. of antimony trioxide and 0.07 g. of calcium acetate monohydrate, and they were heated at 160–225° C. Methanol formed as a result of the ester-exchange reaction was distilled off.

After completion of the ester-exchange reaction, phosphorous acid was added to the reaction mixture in an amount equimolar to the calcium acetate, and the reaction mixture was transferred into a polymerization vessel. The inside temperature was raised to 265° C. over a period of about 30 minutes, and in the subsequent 30 minutes, the inside temperature was elevated to 275° C. and the pressure was reduced to a high vacuum of 0.1–0.3 mm. Hg. Under these temperature and pressure conditions, the high vacuum polycondensation reaction was conducted for about 50 minutes to form a polyester of an intrinsic viscosity of about 0.5. At this stage, the pressure of the reaction system was returned to atmospheric pressure by introduction of nitrogen, and tetraphenyl orthocarbonate was added to the reaction mixture in an amount indicated in Table 6. Then, the reaction was carried out at atmospheric pressure for 3 minutes and the pressure was reduced again to 0.1–0.3 mm. Hg, under which the polycondensation was effected for 30 minutes. The intrinsic viscosity [η] and terminal carboxyl group content (—COOH equivalents per $10^6$ g. of polymer) are shown in Table 6.

TABLE 6

| | Amount added of tetraphenyl ortho-carbonate | | Resulting polyester | |
|---|---|---|---|---|
| | G. | Mole percent | Intrinsic viscosity [η] | Terminal carboxyl content |
| Example No.: | | | | |
| 34 | 0.19 | 0.10 | 0.725 | 5.2 |
| 35 | 0.38 | 0.20 | 0.758 | 4.3 |
| 36 | 0.96 | 0.50 | 0.783 | 3.0 |
| 37 | 1.92 | 1.00 | 9.953 | 1.5 |
| 38 | 4.8 | 2.50 | 0.752 | 1.8 |
| 39 | 9.6 | 5.00 | 0.583 | 0.5 |
| 40 | 19.2 | 10.0 | 0.478 | 0.2 |

EXAMPLES 41–42 AND COMPARATIVE EXAMPLE 10

An ester-exchange reaction vessel was charged with 90 g. of dimethyl terephthalate, 7 g. of dimethyl isophthalate, 69 g. of ethylene glycol, 0.07 g. of magnesium acetate, 0.004 g. of cobalt acetate and 0.04 g. of antimony trioxide, and they were heated at 170–230° C. to effect the ester-exchange reaction.

After completion of the ester-exchange reaction, trimethyl phosphate was added to the reaction mixture in an amount equimolar to the sum of the magnesium acetate and cobalt acetate, and the reaction mixture was transferred into a polymerization vessel. The inside temperature was raised to 260° C. over a period of about 30 minutes, and in the subsequent 30 minutes, the inside temperature was elevated to 285° C. and the pressure was reduced to a high vacuum of 0.1–0.2 mm. Hg. Under these temperature and pressure conditions, the polycondensation was carried out for 40 minutes to form a polyester having an intrinsic viscosity of about 0.40. At this stage, the pressure of the reaction system was returned to atmospheric pressure and an aromatic ortho-carbonate indicated in Table 7 was added to the reaction mixture in an amount of 1.0 mole percent based on the acid component of the polyester. The reaction was carried out at atmospheric pressure for 5 minutes, and the pressure was reduced again to a high vacuum of 0.1–0.2 mm. Hg, under which the polycondensation was conducted for 20 minutes. The intrinsic viscosity [η] and terminal carboxyl group (—COOH equivalents per $10^6$ g. of polymer) of the resulting polyester are shown in Table 7.

The data of the polyester obtained by conducting the polycondensation reaction at 0.1–0.3 mm. Hg for 60 minutes without addition of any aromatic ortho-carbonate are also shown in Table 7 for comparison (see Comparative Example 10).

TABLE 7

| | Aromatic ortho-carbonate | [η] of polyester at time of addition of aromatic ortho-carbonate | Resulting polyester | |
|---|---|---|---|---|
| | | | [η] | Terminal carboxyl group content |
| Example: | | | | |
| 41 | Triphenyl p-octylphenyl ortho-carbonate. | 0.400 | 0.865 | 3.2 |
| 42 | Diphenyl di-α-naphthyl ortho-carbonate. | 0.401 | 0.873 | 3.6 |
| Comparative Example 10 | Not added | | 0.623 | 12.8 |

EXAMPLE 43 AND COMPARATIVE EXAMPLE 11

An ester-exchange reaction vessel was charged with 98 g. of ethyl p-(β-hydroxyethoxy)benzoate, 34 g. of ethylene glycol and 0.071 g. of calcium acetate, and they were heated at 170–230° C. to effect the ester-exchange reaction.

After completion of the ester-exchange reaction, trimethyl phosphate was added to the reaction mixture in an amount equimolar to the calcium acetate, and 0.017 g. of titanium tetrabutoxide was further added to the reaction mixture. Then, the reaction mixture was transferred into a polymerization vessel, and the inside temperature was raised to 260° C. over a period of about 30 minutes. In the subsequent 30 minutes, the inside temperature was elevated to 285° C. and the pressure was reduced to a high vacuum of 0.1–0.2 mm. Hg. Under these temperature and pressure conditions, the polycondensation reaction was conducted for 480 minutes. The intrinsic viscosity of the resulting polyester was 0.285. At this stage, the pressure of the reaction system was returned to atmospheric pressure by introduction of nitrogen, and tetraphenyl orthocarbonate was added to the reaction mixture in an amount of 1.5 mole percent based on the acid component of the polyester. The reaction was conducted at atmospheric pressure for 5 minutes, and the pressure was reduced again to a high vacuum of 0.1–0.2 mm. Hg, under which the polycondensation was furthered for 30 minutes. The intrinsic viscosity [η] of the resulting polyester was 0.452, and the terminal carboxyl group content (—COOH equivalent per $10^6$ g. of polymer) was 1.2.

For comparison, a polyester was prepared by conducting the high vacuum polycondensation reaction at 0.1–0.3 mm. Hg for 510 minutes without using any aromatic ortho-carbonate. The intrinsic viscosity [η] of the resulting polyester was 0.287 and the terminal carboxyl group content was 6.9.

EXAMPLE 44 AND COMPARATIVE EXAMPLE 12

An ester-exchange reaction vessel was charged with 97 parts of dimethyl terephthalate, 84 parts of trimethylene glycol, 0.04 part of antimony trioxide and 0.07 part of calcium acetate monohydrate, and methanol formed as a result of the ester-exchange reaction was distilled off.

After completion of the ester-exchange reaction, phosphorous acid was added to the reaction mixture in an amount equimolar to the calcium acetate, and the reaction mixture was transferred into a polymerization vessel. The inside temperature was raised to 265° C. over a period of about 30 minutes, and in the subsequent 30 minutes, the inside temperature was further elevated to 275° C. and the pressure was reduced to a high vacuum of 0.1–0.3 mm. Hg. Under these temperature and pressure conditions the high vacuum polycondensation was conducted for 60 minutes to form a polyester having an intrinsic viscosity of 0.331. At this stage, the pressure of the reaction system was returned to atmospheric pressure by introduction of nitrogen, and 1.2 parts (0.57 mole percent based on the terephthalic acid component) of tetraphenyl orthocarbonate were added to the reaction mixture. The reaction was carried out at atmospheric pressure for 3 minutes, and then the pressure was reduced again to a higher vacuum of 0.1–0.3 mm. Hg, under which the polycondensation was furthered for 30 minutes. The intrinsic viscosity [η] of the resulting polyester was 0.785 and the terminal carboxyl group content (—COOH equivalents per $10^6$ g. of polymer) was 4.5.

For comparison, a polyester was prepared by conducting the high vacuum polycondensation at 0.1–0.3 mm. Hg. for 90 minutes without employing tetraphenyl ortho-carbonate. The intrinsic viscosity of the polyester was 0.543 and the terminal carboxyl group content was 24 equivalents per $10^6$ g. of polymer.

EXAMPLE 45

100 g. of chips of the polyester prepared in Comparative Example 2 was dried at 160° C. for 6 hours, and transferred into a polymerization flask. The chips were re-molten at 280° C. in a nitrogen gas current. The intrinsic viscosity of the molten polyester was 0.598. To the molten polyester 1.92 g. of tetraphenyl ortho-carbonate were added, and the pressure was gradually reduced to 0.2–0.3 mm. Hg, under which the polycondensation was conducted for 20 minutes. The intrinsic viscosity of the resulting polyester was 0.953 and the terminal carboxyl group content was 9.5 equivalents per $10^6$ g. of polymer.

EXAMPLE 46 AND COMPARATIVE EXAMPLE 13

A mixture of 97 g. of dimethyl terephthalate, 160 g. of cyclohexane dimethanol (1.4) and 0.02 g. of tetraisopropyl titanate was heated at 160–225° C. to effect the ester exchange reaction, and methanol formed as a result of the ester-exchange reaction was distilled off. Then, the bath temperature was raised to 285° C. and the pressure was gradually reduced to 0.2 mm. Hg. Under these temperature and pressure conditions, the polycondensation was conducted for 60 minutes to form a polyester having an intrinsic viscosity of 0.365. At this stage 1.92 g. of diphenyl-ditolyl ortho-carbonate were added to the reaction mixture, and the polycondensation was furthered for 60 minutes at a high vacuum of 0.2 mm. Hg. The intrinsic viscosity of the resulting polyester was 0.752 and the terminal carboxyl group content was 2.3 equivalents per $10^6$ g. of polymer.

For comparison, a polyester was prepared by conducting the high vacuum polycondensation at 0.2 mm. Hg for 120 minutes without employing diphenyl-ditolyl ortho-carbonate. The intrinsic viscosity of the polyester was 0.549 and the terminal carboxyl group content was 12.1 equivalents per $10^6$ g. of polymer.

EXAMPLE 47 AND COMPARATIVE EXAMPLE 14

A mixture of 50 g. of dimethyl adipate, 75 g. of hexamethylene glycol and 0.03 g. of tetrabutyl titanate was heated at 170–220° C. to effect the ester-exchange reaction. After completion of the ester-exchange reaction, the bath temperature was raised to 270° C. and the pressure was gradually reduced to 0.1 mm. Hg. Under these temperature and pressure conditions, the polycondensation was carried out for 60 minutes. The intrinsic viscosity of the resulting polyester was 0.45. At this stage, the pressure of the reaction system was returned to atmospheric pressure, and 1.5 g. of tetraphenyl ortho-carbonate were added to the reaction mixture. Then the pressure was reduced to a high vacuum of 0.1 mm. Hg and the polycondensation was carried out for 30 minutes. The intrinsic viscosity and terminal carboxyl group content of the resulting polyester are shown in Table 8.

For comparison Table 8 shows the intrinsic viscosity and terminal carboxyl group content of a polyester obtained by conducting the high vacuum polycondensation at 0.1 mm. Hg for 90 minutes without using tetraphenyl ortho-carbonate (Comparative Example 14).

TABLE 8

| | | Total time of high vacuum polycondensation (min.) | Resulting polyester | |
|---|---|---|---|---|
| | Additive | | [η] | —COOH equivalents per $10^6$ g. of polymer |
| Example 47 | Tetraphenyl ortho-carbonate. | 90 | 0.95 | 12.5 |
| Comparative Example 14. | Not added | 90 | 0.71 | 20.0 |

EXAMPLE 48 AND COMPARATIVE EXAMPLE 15

An ester-exchange reaction vessel was charged with 20 kg. of dimethyl terephthalate, 13.2 kg. of ethylene glycol, 7.4 g. of manganese acetate and 8.08 g. of antimony trioxide, and they were heated at 170–230° C. to effect the ester-exchange reaction. After completion of the ester-exchange reaction, trimethyl phosphate was added to the reaction mixture in an amount equimolar to the manganese acetate, and the reaction mixture was transferred into a polymerization vessel. The inside temperature was raised to 260° C. over a period of about 15 minutes. In the subsequent 60 minutes, the inside temperature was elevated to 285° C. and the pressure was reduced to a high vacuum of 0.1–0.2 mm. Hg. The polycondensation was furthered at 0.1–0.2 mm. Hg. The intrinsic viscosity of the resulting polyester was 0.531. At this stage, the pressure of the reaction system was returned to atmospheric pressure by introduction of nitrogen, and 192 g. of tetraphenyl orthocarbonate were added to the reaction mixture. The reaction was carried out for 5 minutes at atmospheric pressure and then the pressure was reduced again to 0.1–0.2 mm. Hg, under which the polycondensation was furthered for 20 minutes. The intrinsic viscosity of the resulting polyester was 0.725. At this stage, 96 g. of tetraphenyl orthocarbonate was further added to the reaction mixture in the same manner as above. Then, the polycondensation was furthered at a high vacuum. The resulting polyester was characterized by an intrinsic viscosity of 1.08 and a terminal carboxyl content of 3.8 equivalents per $10^6$ g. of polymer. This high polymer was spun by means of a melt-spinning machine to obtain filaments having an intrinsic viscosity of 0.98 and a terminal carboxyl group content of 6.8 equivalents per 10⁶ g. of filaments. The filaments were stretched at a draw ratio of 4.9 at 90° C. and at a ratio of 1.2 at 180° C., and then subjected to heat treatment. The stretched filamentary yarn was twisted by a conventional method to form a tire-reinforcing cord. Then, the cord was subjected to the wet-heat resistance test in the following manner.

A sample was allowed to stand still at a relative humidity of 65% and at a temperature of 25° C. for 48 hours. Then, it was packed in a tube and the tube was sealed. In the sealed tube the sample was maintained at 150° C. for 48 hours. The strength (kg./2000 de.) of the sample was measured either before the test or after the test. Then, the strength retention (percent) was calculated according to the following formula:

Strength retention (percent)
$$= \frac{\text{strength of tire cord after wet-heat resistance test}}{\text{strength of tire cord before wet-heat resistance test}} \times 100$$

Results are shown in Table 9.

For comparison, a polyester was prepared in the same manner as above except that 300 g. of diphenyl carbonate were used instead of the tetraphenyl carbonate. The intrinsic viscosity of the polyester was 1.07 and the terminal carboxyl group content was 21.2 equivalents per 10⁶ g. of polymer. From this polyester, a tire cord was prepared by conducting the spinning and drawing procedures in the same manner as above, and it was similarly subjected to the wet-heat resistance test. Results are shown in Table 9.

TABLE 9

|  | Example 48 | Comparative Example 15 |
|---|---|---|
| Intrinsic viscosity of tire cord | 0.98 | 0.97 |
| Terminal carboxyl group content in tire cord | 6.8 | 25.3 |
| Strength of tire cord before wet-heat test (kg./2,000 de) | 15.5 | 15.4 |
| Strength retention, percent | 93 | 78 |

EXAMPLE 49 AND COMPARATIVE EXAMPLE 16

An autoclave equipped with a condenser was charged with 8.3 kg. of terephthalic acid, 43 kg. of benzene, 4.4 kg. of ethylene oxide and 50 g. of triethylamine, and they were reacted at 180° C. in a nitrogen atmosphere for 10 minutes. A valve at the top of the condenser was opened, and the evaporation and cooling was effected until the temperature of the reaction mixture was lowered to 130° C. Then, the reaction mixture was transferred into a pressure filter, where the unreacted terephthalic acid was separated by filtration. While the temperature was maintained at 130° C., the upper benzene layer was separated from the molten layer of benzene-insoluble matters. The benzene layer was cooled to precipitate bis-β-hydroxyethyl terephthalate. The yield was 10.4 kg.

A polymerization vessel was charged with 19.65 kg. of bis-β-hydroxyethyl terephthalate synthesized by the above mehod, 6.06 g. of antimony trioxide and 0.93 g. of trimethyl phosphate. They were reacted at 285° C. in a nitrogen gas current at atmospheric pressure for 15 minutes. Then, the pressure was reduced to 0.5 mm. Hg over a period of 45 minutes, and the polycondensation was conducted for 100 minutes at a reduced pressure of 0.5–0.2 mm. Hg. At this stage, the polyester exhibited an intrinsic viscosity of 0.652. To this polyester 200 g. of solid tetraphenyl ortho-carbonate were added in vacuo, and the polycondensation was furthered for 60 minutes. The intrinsic viscosity of the resulting polyester was 1.02 and the terminal carboxyl group content was 9.5 equivalents per 10⁶ g. of polymer.

For comparison, a polyester was prepared by conducting the high vacuum polycondensation for 160 minutes without effecting the addition of tetraphenyl ortho-carbonate. The resulting polyester had an intrinsic viscosity of 0.782 and a terminal carboxyl group content of 27.8 equivalents per 10⁶ g. of polymer.

What we claim is:

1. In a process for the preparation of substantially linear, highly polymerized carboxylic acid esters by removing, from a glycol ester of a dicarboxylic or hydroxycarboxylic acid or its low condensate, the glycol to thereby effect the polycondensation, an improvement comprising adding an aromatic ortho-carbonate expressed by the formula

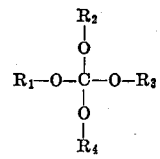

wherein $R_1$, $R_2$, $R_3$ and $R_4$, which may be the same or different, represent a monovalent aromatic group containing a benzene or naphthalene nucleus, which is inert to the ester-forming reaction and has a molecular weight not exceeding 250, to a molten polyester having an intrinsic viscosity of at least 0.2 as calculated from the value measured in orthochlorophenol at 35° C. and conducting the polycondensation under conditions such that the reaction mixture is maintained in the molten state at a subatmospheric pressure.

2. The improvement according to claim 1, wherein the glycol is a 1,2-glycol.

3. The improvement according to claim 1 wherein the dicarboxylic acid is selected from terephthalic acid and naphthalene-2,6-dicarboxylic acid.

4. The improvement according to claim 1, wherein the aromatic ortho-carbonate is selected from members expressed by the formula

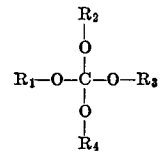

wherein $R_1$, $R_2$, $R_3$ and $R_4$, which may be the same or different, stand for a member selected from phenyl and naphthyl groups which may have one or more substituents selected from the group consisting of aliphatic hydrocarbon residues, alicyclic hydrocarbon residues, aromatic hydrocarbon residues, halogen atoms, nitro group, alkoxy groups and aryloxy groups, with the proviso that each of aromatic groups $R_1$, $R_2$, $R_3$ and $R_4$ has a molecular weight not exceeding 200.

5. The improvement according to claim 1, wherein the aromatic ortho-carbonate is tetraphenyl ortho-carbonate.

6. The improvement according to claim 1, wherein the aromatic ortho-carbonate is added to a molten polyester having an intrinsic viscosity of at least 0.3 as calculated from the value measured in orthochlorophenol at 35° C.

7. The improvement according to claim 1, wherein the amount of the aromatic ortho-carbonate to be added at one time is N mole percent expressed by the following Formula II $$N \leq 3 \times [\eta]^{-1.3} \quad \quad (II)$$

wherein [η] designates the intrinsic viscosity of the polyester at the time when the aromatic ortho-carbonate is added, and N stands for the mole percent of the aromatic ortho-carbonate to be added based on the total acid components constituting the polyester.

8. The improvement according to claim 1, wherein the amount of the aromatic ortho-carbonate to be added at one time is N' mole percent expressed by the following Formula II'

$$N' \leq 1 \times [\eta]^{-1.3} \quad \quad (II')$$

wherein [η] designates the intrinsic viscosity of the polyester at the time when the aromatic ortho-carbonate is added, and N' stand for the mole percent of the aromatic ortho-carbonate to be added based on the total acid components constituting the polyester.

9. The improvement according to claim 1, wherein the aromatic ortho-carbonate is added to the molten polyester in an amount of N mole percent expressed by the following Formula III $$0.05 \times [\eta]^{-1.3} \leq N \qquad (III)$$

wherein $[\eta]$ designates the intrinsic viscosity of the polyester at the time when the aromatic ortho-carbonate is added, and N stands for the mole percent of the aromatic ortho-carbonate to be added based on the total acid components constituting the polyester.

10. The improvement according to claim 1, wherein the aromatic ortho-carbonate is added to the molten polyester in an amount of N' mole percent expressed by the following Formula III'

$$0.1 \times [\eta]^{-1.3} \leq N' \qquad (III')$$

wherein $[\eta]$ designates the intrinsic viscosity of the polyester at the time when the aromatic ortho-carbonate is added, and N' stands for the mole percent of the aromatic ortho-carbonate to be added based on the total acid components constituting the polyester.

11. The improvement according to claim 1, wherein during the step of the condensation polymerization of at least one acid component selected from the group consisting of aromatic dibasic acids, their functional derivatives, aromatic hydroxycarboxylic acids and their functional derivatives, with at least one 1,2-glycol, at least one aromatic ortho-carbonate is added to the reaction product when the reaction product has an intrinsic viscosity, as calculated from the value measured in orthochlorophenol at 35° C., of at least 0.2.

12. The improvement according to claim 1, wherein during the step of the condensation polymerization of at least one acid component selected from the group consisting of aromatic dibasic acids, their functional derivatives, aromatic hydroxycarboxylic acids and their functional derivatives, with at least one 1,2-glycol, at least one aromatic ortho-carbonate is added to the reaction product when the reaction product has an intrinsic viscosity, as calculated from the value measured in orthochlorophenol at 35° C., of at least 0.3.

References Cited

UNITED STATES PATENTS 3,433,770   3/1969   Shima et al.
3,444,141   5/1969   Shima et al.

MELVIN GOLDSTEIN, Primary Examiner